US011487559B2

(12) United States Patent
Pavlou

(10) Patent No.: US 11,487,559 B2
(45) Date of Patent: Nov. 1, 2022

(54) DYNAMICALLY SWITCHING BETWEEN POINTER MODES

(71) Applicant: Citrix Systems, Inc., Fort Lauderdale, FL (US)

(72) Inventor: Chris Pavlou, Boca Raton, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 239 days.

(21) Appl. No.: 16/825,037

(22) Filed: Mar. 20, 2020

(65) Prior Publication Data

US 2021/0105306 A1 Apr. 8, 2021

Related U.S. Application Data

(60) Provisional application No. 62/911,520, filed on Oct. 7, 2019.

(51) Int. Cl.
*G06F 9/451* (2018.01)
*G06F 3/0484* (2022.01)
(Continued)

(52) U.S. Cl.
CPC ............ *G06F 9/452* (2018.02); *G06F 3/0484* (2013.01); *G06F 3/0488* (2013.01); *G06F 3/04812* (2013.01); *G06F 2203/0383* (2013.01)

(58) Field of Classification Search
CPC ................... G06F 9/452; G06F 3/0484; G06F 3/0481–04812; G06F 3/0488–04886;
(Continued)

(56) References Cited

U.S. PATENT DOCUMENTS 5,867,106 A * 2/1999 Bi .................. G06F 1/3262
340/5.54
6,710,790 B1 * 3/2004 Fagioli .............. G06F 3/0481
715/778
(Continued)

FOREIGN PATENT DOCUMENTS

EP  31739036 A2  5/2017
KR  1020110007114 A  1/2011

OTHER PUBLICATIONS

Gaunting et al., "Method for Operating Simulation Touch Screen by Mouse", a machine English translation version of Chinese Patent Application CN 103472931A, published Dec. 25, 2013, pp. 1-24.
(Continued)

*Primary Examiner* — David S Posigian
(74) *Attorney, Agent, or Firm* — BainwoodHuang

(57) ABSTRACT

Techniques process, in a user device, pointer input from an input device. Such techniques involve providing the input from the input device to a remote desktop session which is hosted on equipment that is remote from the user device. Such techniques further involve detecting an event on the user device, the event being indicative of deactivation of the remote desktop session. Such techniques further involve, in response to detecting the event, providing the input from the input device to at least one local application executable on the user device to enable continued processing of the input from the input device with use of the at least one local application instead of the remote desktop session.

16 Claims, 7 Drawing Sheets

(51) Int. Cl.
*G06F 3/04812* (2022.01)
*G06F 3/0488* (2022.01)

(58) Field of Classification Search
CPC .... G06F 3/033; G06F 3/0354; G06F 3/03543; G06F 3/035444; G06F 3/03541; G06F 3/038; G06F 3/1454; G06F 3/1462; G06F 3/017; G06F 3/041–047; G06F 2203/0383; G06F 13/107; G06F 1/1643; G06F 1/1692; G06F 3/03544; H04L 65/1066; H04L 37/38; H04L 67/025; H04L 67/08; G05B 2219/36168
See application file for complete search history.

(56) References Cited

U.S. PATENT DOCUMENTS

| | | | |
|---|---|---|---|
| 7,870,496 B1* | 1/2011 | Sherwani | H04L 67/38 715/761 |
| 8,704,765 B1* | 4/2014 | Murphy | G06F 3/038 345/157 |
| 8,937,590 B2* | 1/2015 | Hachiya | G06F 3/0488 345/157 |
| 9,110,581 B2 | 8/2015 | Momchilov | |
| 9,152,436 B2 | 10/2015 | Momchilov | |
| 9,514,507 B2 | 12/2016 | McKenzi et al. | |
| 9,588,637 B2 | 3/2017 | Momchilov et al. | |
| 9,729,520 B2 | 8/2017 | Barton et al. | |
| 9,736,221 B2 | 8/2017 | Momchilov et al. | |
| 9,760,724 B2 | 9/2017 | Frost | |
| 2004/0001044 A1* | 1/2004 | Luciani, Jr. | G06F 3/04812 345/157 |
| 2004/0004603 A1 | 1/2004 | Gerstner et al. | |
| 2005/0088410 A1* | 4/2005 | Chaudhri | G06F 3/04812 345/157 |
| 2005/0104852 A1* | 5/2005 | Emerson | G06F 3/038 345/157 |
| 2006/0195637 A1 | 8/2006 | Zhang et al. | |
| 2008/0120448 A1 | 5/2008 | Shi et al. | |
| 2008/0174570 A1 | 7/2008 | Jobs et al. | |
| 2008/0222326 A1 | 9/2008 | Liu et al. | |
| 2010/0268828 A1 | 10/2010 | Pahlavan et al. | |
| 2010/0269039 A1* | 10/2010 | Pahlavan | G06F 9/452 715/702 |
| 2011/0109552 A1 | 5/2011 | Yasutake | |
| 2012/0005269 A1* | 1/2012 | Janssen | G06F 3/0481 709/203 |
| 2012/0011280 A1* | 1/2012 | Gilboa | G06F 9/451 709/246 |
| 2012/0092277 A1* | 4/2012 | Momchilov | G06F 3/041 345/173 |
| 2013/0166629 A1 | 6/2013 | Ivashin et al. | |
| 2013/0262560 A1 | 10/2013 | Ivashin et al. | |
| 2013/0328779 A1* | 12/2013 | Butner | G06F 3/0488 345/163 |
| 2014/0002361 A1 | 1/2014 | Ballard et al. | |
| 2014/0075062 A1 | 3/2014 | Yasuno et al. | |
| 2014/0319232 A1 | 10/2014 | Gourlay et al. | |
| 2014/0344766 A1* | 11/2014 | Cao | G06F 3/04883 715/863 |
| 2015/0077352 A1 | 3/2015 | Ma | |
| 2016/0132214 A1* | 5/2016 | Koushik | G06F 9/455 715/741 |
| 2016/0342258 A1* | 11/2016 | Han | G06F 3/02 |
| 2017/0123649 A1* | 5/2017 | Clavel | G06F 3/04883 |
| 2017/0336883 A1* | 11/2017 | Pavlou | G06F 3/03543 |
| 2017/0336884 A1* | 11/2017 | Pavlou | G06F 3/03543 |

OTHER PUBLICATIONS

"Windows Touch Gestures Overview.pdf", extracted from website, https://web.archive.org/web/20151121192051/https://msdn.microsoft.com/en-us/library/windows/desktop/dd940543(v=vs.85).aspx, published Nov. 21, 2015, pp. 1-5.

"Making the Mouse Left-Handed in Windows 7.pdf", extracted from website, https://web.archive.org/web/20130304035512/http://www.bbc.co.uk/accessibility/guides/mouse_easier/left_handed/win/win7/index.shtml#extversion, published Mar. 4, 2013, pp. 1-3.

Liao, Tiansu, CN102778966A_ENG_Espacenet.pdf; Espacenet machine translation of Chinese patent publication CN102778966A, published Nov. 14, 2012.

International Search Report for International Application No. PCT/US2020/039787 mailed from the International Searching Authority (KR) dated Sep. 28, 2020, 12 pages.

* cited by examiner

DYNAMICALLY SWITCHING BETWEEN POINTER MODES

CROSS REFERENCE TO RELATED APPLICATIONS

This application is a regular utility of earlier-filed U.S. Application No. 62/911,520, filed on Oct. 7, 2019, the contents and teachings of which are hereby incorporated by reference in their entirety.

BACKGROUND

A conventional electronic tablet includes a touchscreen to receive finger gestures from a user while simultaneously displaying content to the user. Example finger gestures include a single finger tap, a double finger tap, a single finger swipe, a two finger swipe, a pinch-in gesture (two fingers moving towards each other), and a pinch-out gesture (two fingers moving away from each other).

Such a conventional electronic tablet may further include a wireless interface to receive mouse input from a wireless computer mouse. Example mouse input includes mouse coordinates, button presses, button releases, scrolling input, and so on.

SUMMARY

Improved techniques involve dynamically switching a user device (e.g., a smart phone, a tablet, a laptop equipped with a touchscreen, other mobile and/or touch devices, etc.) between a native pointer mode and a desktop-class pointer mode when processing input from an input device (e.g., a trackball, a trackpad, a touchscreen, an external mouse, and other pointing or peripheral computing devices, etc.). Such mode changing may involve more than merely changing pointer graphics by controlling how to process input from the input device (e.g., interpreting the input as standard pointer input for a local application vs. sending the input to a remote desktop session, etc.). Such mode switching may be in response to events such as context changes (e.g., establishing/closing a remote desktop session, switching focus between a local application and a remote desktop session, etc.) which occur and are detected in real time.

In the native pointer mode, the user device receives standard pointer input from an input device and, in response to the standard pointer input, provides standard pointer behavior which may be viewable on the touchscreen. Such standard pointer behavior may include displaying a native pointer, moving the native pointer in response to movement of the input device, enabling the standard pointer input to control one or more local applications, etc. Additionally, the user device may provide the standard pointer behavior while responding to gestures provided on a touchscreen of the user device such as taps, swipes, two-finger swipes, simple touchscreen gestures which are mapped to assistive or complex touchscreen gestures, and so on.

In the desktop-class pointer mode, the user device receives desktop-class pointer input from the input device and, in response to the desktop-class pointer input, provides desktop-class pointer behavior instead of the standard pointer behavior. In particular, the user device hides (or no longer displays on the touchscreen) the native pointer and sends the desktop-class pointer input to a desktop-class (or style) interface which enables the user to access a desktop-class environment using the user device and the input device. The desktop-class environment may include a remote desktop (or virtualized) session to control a set of remote desktop session resources hosted on remote session equipment. Examples of a remote resource include a remote (or virtual) desktop or workspace, a remote application, a remote virtual machine and a remote session platform, and so on.

As part of the remote desktop session, the touchscreen of the user device displays a workspace environment that appears to be local (e.g., a view or image of a desktop) and a virtualized pointer (e.g., a mouse cursor or similar pointing icon) that moves within that workspace environment in response to the desktop-class pointer input. Accordingly, the user is able to control a rich and robust set of remote desktop session resources which are external to the user device using the input device.

In accordance with certain embodiments, the user device may disable certain touchscreen features. For example, if the user device maps simple touchscreen gestures to assistive or complex touchscreen gestures during native pointer mode, the user device may turn off such features during desktop-class pointer mode.

To enable the user device to transition between the native pointer mode and the desktop-class pointer mode, the user device is constructed and arranged to dynamically switch between these pointer modes in response to events such as context changes. Such context changes may include launching a special workspace application that creates/opens the desktop-class interface, closing the desktop-class interface, activating a local environment (or local application) after working in the desktop-class interface, activating the desktop-class interface after working in the local environment, establishing and/or closing a remote desktop session while the desk-top class interface continues to run on the user device, identifying pointer transitions within multiscreen layouts (e.g., edge detection), and so on.

Accordingly, the user device may reside (or operate) in the native pointer mode at one time, and the desktop-class pointer mode at another time. Furthermore, switching between the pointer modes may be transparent/automated without burdening the user.

One embodiment is directed to a method of processing, in a user device, pointer input from an input device such as an external mouse or similar pointing device. The method includes providing the input from the input device to a remote desktop session which is hosted on equipment that is remote from the user device. The method further includes detecting an event on the user device, the event being indicative of deactivation of the remote desktop session. The method further includes, in response to detecting the event, providing the input from the input device to at least one local application executable on the user device to enable continued processing of the input from the input device with use of the at least one local application instead of the remote desktop session.

In some arrangements, the user device includes a touchscreen. Additionally, providing the input from the input device to the remote desktop session includes displaying a first cursor on the touchscreen and moving the first cursor in response to the input from the input device. Furthermore, providing the input from the input device to the at least one local application executable on the user device includes displaying a second cursor on the touchscreen in place of the first cursor and moving the second cursor in response to the input from the input device, the first cursor and the second cursor being visually different.

In some arrangements, the method further includes, while providing the input from the input device to the remote desktop session, displaying a view of a virtual desktop on the touchscreen. The first cursor moves within the view of the virtual desktop in response to the input from the input device.

In some arrangements, displaying the first cursor on the touchscreen and moving the first cursor in response to the input from the input device includes controlling at least one remote application viewable in the virtual desktop using the input from the input device. The at least one remote application is hosted remotely from the user device.

In some arrangements, the method further includes sending, from the user device to the input device, a wireless command that switches the input device from a desktop-class pointer state in which the input device provides desktop-class pointer data as the input to a native pointer state in which the input device provides native pointer data as the input.

In some arrangements, the method further includes detecting another event, the another event indicative of activation of the remote desktop session; and in response to detecting the another event, providing the input from the input device to the remote desktop session.

In some arrangements, the method further includes sending, from the user device to the input device, another wireless command to switch the input device from the native pointer state to the desktop-class pointer state.

In some arrangements, the method further includes, after the input from the input device is provided to the at least one local application, detecting another event, the another event indicative of activation of the remote desktop session; and in response to detecting the another event, transitioning from a native pointer mode back to a desktop-class pointer mode, the native pointer mode configured to provide the input from the input device to the at least one local application, and the desktop-class pointer mode configured to provide the input from the input device to the remote desktop session.

In some arrangements, the method further includes, before the input from the input device is provided to the remote desktop session, detecting another event, the another event indicative of activation of the remote desktop session; and in response to detecting the another event, transitioning from a native pointer mode to a desktop-class pointer mode, the native pointer mode configured to provide the input from the input device to the at least one local application, and the desktop-class pointer mode configured to provide the input from the input device to the remote desktop session.

In some arrangements, detecting the event includes detecting, as the event, deactivation and placement of the remote desktop session in the background. Additionally, the method further includes switching from providing the input from the input device to the remote desktop session to providing the input from the input device to the at least one local application in response to deactivation and placement of the remote desktop session in the background.

In some arrangements, detecting the event includes detecting, as the event, termination of the remote desktop session. Additionally, the method further includes switching from providing the input from the input device to the remote desktop session to providing the input from the input device to the at least one local application in response to termination of the remote desktop session.

In some arrangements, detecting the event includes detecting, as the event, activation of the at least one local application over the remote desktop session. Additionally, the method further includes switching from providing the input from the input device to the remote desktop session to providing the input from the input device to the at least one local application in response to activation of the at least one local application over the remote desktop session.

In some arrangements, detecting the event includes detecting, as the event, exiting of the remote desktop session due to an application crash. Additionally, the method further includes switching from providing the input from the input device to the remote desktop session to providing the input from the input device to the at least one local application in response to exiting of the remote desktop session due to an application crash.

In some arrangements, the input device is an external mouse. Additionally, the user device communicates with the external mouse via Bluetooth® wireless technology. Furthermore, the user device communicates with the remote desktop session via a computerized network.

Another embodiment is directed to a computer program product having a non-transitory computer readable medium that stores a set of instructions to process pointer input from an input device. The set of instructions, when carried out by a user device, causes the user device to perform a method of:
  (A) providing the input from the input device to a remote desktop session which is hosted on equipment that is remote from the user device;
  (B) detecting an event on the user device, the event indicative of deactivation of the remote desktop session; and
  (C) in response to detecting the event, providing the input from the input device to at least one local application executable on the user device to enable continued processing of the input from the input device with use of the at least one local application instead of the remote desktop session.

Yet another embodiment is directed to a user device which includes a touchscreen, memory, and control circuitry coupled to the touchscreen and the memory. The memory stores instructions that, when carried out by the control circuitry, cause the control circuitry to:
  (A) provide the input from the input device to a remote desktop session which is hosted on equipment that is remote from the user device,
  (B) detect an event on the user device, the event indicative of deactivation of the remote desktop session, and
  (C) in response to detecting the event, provide the input from the input device to at least one local application executable on the user device to enable continued processing of the input from the input device with use of the at least one local application instead of the remote desktop session.

It should be understood that, in the cloud context, some electronic circuitry is formed by remote computer resources that may be distributed over a network. Such a computerized environment is capable of providing certain advantages such as distribution of hosted services and resources (e.g., software as a service, platform as a service, infrastructure as a service, etc.), enhanced scalability, etc.

Another embodiment is directed to a method of controlling a user device from an input device. The method includes:
  (A) providing first input from the input device to the user device to control a remote desktop session which is hosted on equipment that is remote from the user device;
  (B) providing second input from the input device to the user device to provide a context change from the remote desktop session to at least one local application executable on the user device; and (C) after the context change, providing third input from the input device to the user device to control the at least one local application instead of the remote desktop session.

In some arrangements, providing the first input includes operating in a desktop-class pointer state to provide desktop-class pointer input to the user device. Additionally, providing the third input includes operating in a native pointer state to provide native pointer input to the user device. Also, the method further includes transitioning from the desktop-class pointer state to the native pointer state in response to a command from the user device indicating that the user device has dynamically switched from a desktop-class pointer mode to a native pointer mode due to the context change from the remote desktop session to the at least one local application executable.

In some arrangements, the method further includes after providing the third input, providing fourth input from the input device to the user device. Such input provides another context change from the at least one local application executable on the user device to the remote desktop session which is hosted on the equipment that is remote from the user device.

Yet another embodiment is directed to an input device which includes a body, a communications interface, and circuitry disposed with the body and coupled with the communications interface. The circuitry is constructed and arranged to:

(A) provide first input to a user device through the communications interface to control a remote desktop session which is hosted on equipment that is remote from the user device, (B) provide second input to the user device through the communications interface to provide a context change from the remote desktop session to at least one local application executable on the user device, and (C) provide third input to the user device through the communications interface to control the at least one local application instead of the remote desktop session.

Other embodiments are directed to electronic systems and apparatus, processing circuits, computer program products, and so on. Some embodiments are directed to various methods, electronic components and circuitry that are involved in dynamically switching between a native pointer mode and a desktop-class pointer mode.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to dynamically switching a user device (e.g., a smart phone, a tablet, a laptop equipped with a touchscreen, other mobile and/or touch devices, etc.) between a native pointer mode and a desktop-class pointer mode when processing input from an input device such as an external mouse. Such switching may be in response to events such as context changes (e.g., establishing/closing a remote desktop session, switching focus between a local application and a remote desktop session, etc.) which occur and are detected in real time. Moreover, such switching between the pointer modes may be transparent/automated without burdening the user.

The individual features of the particular embodiments, examples, and implementations disclosed herein can be combined in any desired manner that makes technological sense. Moreover, such features are hereby combined in this manner to form all possible combinations, permutations and variants except to the extent that such combinations, permutations and/or variants have been explicitly excluded or are impractical. Support for such combinations, permutations and variants is considered to exist in this document.

Figure 1:
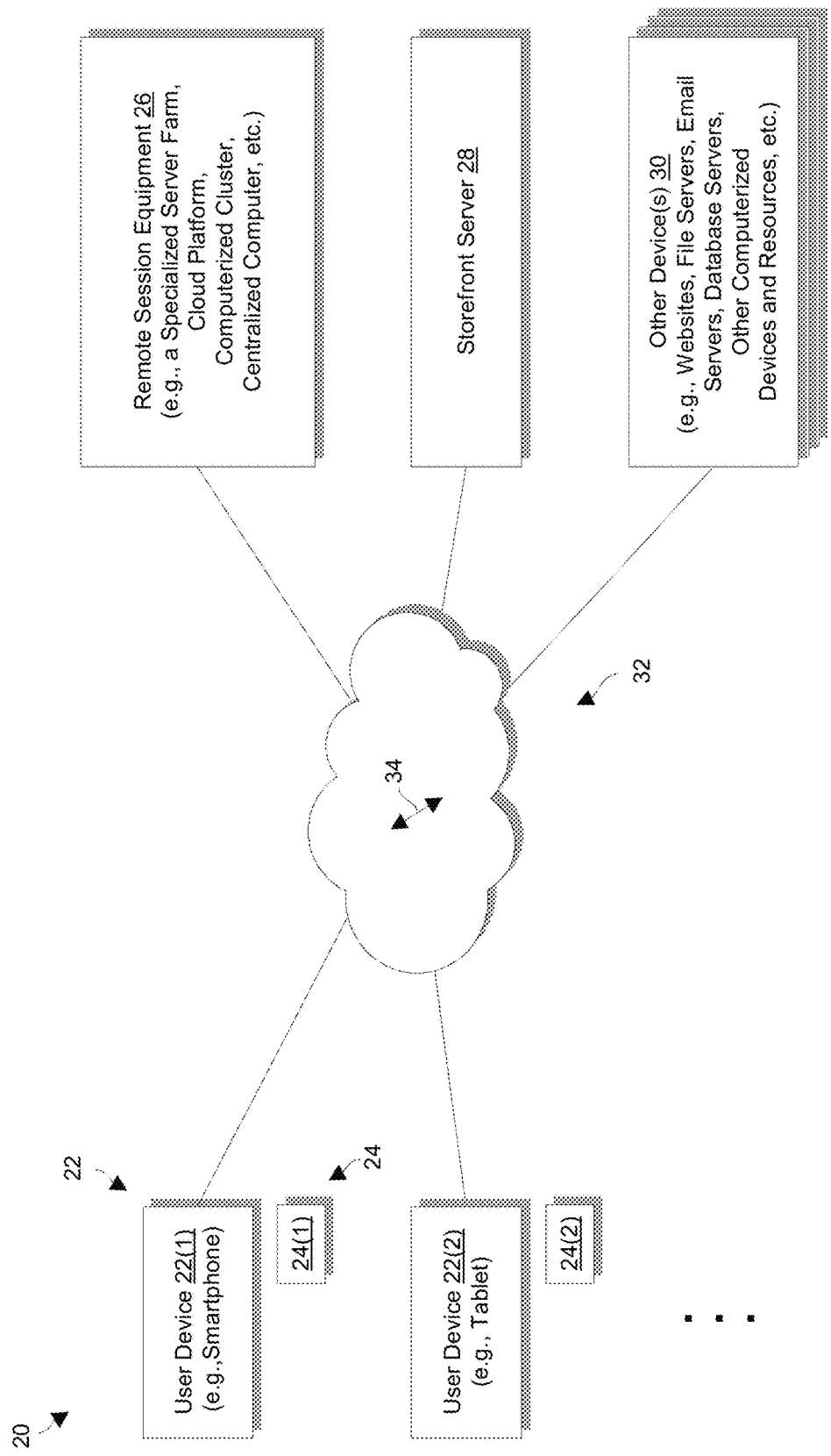
FIG. 1 is a block diagram of a computing environment having at least one user device capable of dynamically switching between a native pointer mode and a desktop-class pointer mode in accordance with certain embodiments.

FIG. 1 shows a computing environment 20 having at least one user device capable of dynamically switching between a native pointer mode and a desktop-class pointer mode in accordance with certain embodiments. The computing environment 20 includes user devices 22(1), 22(2), . . . (collectively, user devices 22), input devices 24(1), 24(2), . . . (collectively, input devices 24), remote session equipment 26, a storefront server 28, other devices 30, and a communications medium 32.

The user devices 22 are equipped with touchscreens and are constructed and arranged to perform useful work. For example, users may enter user input via the touchscreens to install and/or control local applications, virtual desktop clients or other workspace-style applications, and so on.

The input devices 24 are constructed and arranged to provide user input to the user devices 22 to control various applications running on the user devices 22. As will be explained in further detail below, the input devices 24 may be external to the user devices 22, and are equipped to control local applications as well as remote desktop sessions. To this end, the input devices 24 are provisioned (or augmented) beyond simple hardware peripheral devices by including circuitry that selectively operates in either a native pointer state (to provide standard pointer input) or a desktop-class pointer state (to provide augmented pointer input). The particular state of an input device 24 may be controlled by commands/signals from a paired and connected user device 22 (e.g., a first command to transition the input device 24 from the native pointer state to the desktop-class pointer state and a second or reset command to transition the input device 24 back to the native pointer state).

As shown in FIG. 1, input device 24(1) provides pointer input to the user device 22(1), input device 24(2) provides pointer input to the user device 22(2), and so on. In some arrangements, communications between an input device 24 and a respective user device 22 is wireless (e.g., facilitated by Bluetooth® wireless technology and/or other RF technologies).

In accordance with certain embodiments, the input devices 24 may operate in different states such as a native (or standard/default) pointer state and a desktop-class (or augmented/special protocol) pointer state. In the native pointer state, the input devices 24 provide standard pointer input to control user device local applications. In the desktop-class pointer state, the input devices 24 provide augmented pointer input to control remote desktop sessions. Further details of the pointer signals provided by the input devices 24 will be provided shortly.

The remote session equipment 26 is constructed and arranged to provide access to remote desktop session resources such as a remote desktop or workspace, a remotely hosted application, a remote virtual machine, a remote session platform, and so on. For example, a user may run a virtual desktop client (or similar workspace-style application) on a user device 22 to access a remote desktop provided by the remote session equipment 26. In such a situation, the remote desktop may include a variety of remote desktop applications such as a document editor, an email client, a calendar tool, a web browser, and so on.

The storefront server 28 is constructed and arranged to provide an interface (e.g., a storefront website) for users to access a variety of applications (e.g., virtual desktop client software, software to access other hosted virtualization services, other enterprise applications, and so on). Accordingly, the user devices 22 may download, install, enroll, subscribe, and/or otherwise obtain access to a variety of resources through the storefront server 28.

The other devices 30 represent other equipment/apparatus that reside within the computing environment 20 (e.g., email servers, file servers, database servers, websites, other equipment that provides services and/or content for remote desktops, etc.). Such other equipment may be distributed among different locations, located within datacenters, may be cloud-based, combinations thereof, and so on.

The communications medium 32 is constructed and arranged to connect the various components of the computing environment 20 together to enable these components to exchange electronic signals 34 (e.g., see the double arrow 34). At least a portion of the communications medium 32 is illustrated as a cloud to indicate that the communications medium 32 is capable of having a variety of different topologies including backbone, hub and spoke, loop, irregular, combinations thereof, and so on. Along these lines, the communications medium 32 may include copper based data communications devices and cabling, fiber optic devices and cabling, wireless devices, combinations thereof, etc. Furthermore, the communications medium 32 is capable of supporting a variety of communications types such as Ethernet-based communications, cellular communications, plain old telephone service (POTS) communications, combinations thereof, and so on.

In some situations, at least a portion of the computing environment 20 utilizes a virtualization platform that runs virtual machines (VMs) for scalability, load balancing, fault tolerance, and so on. In some arrangements, one or more components of the computing environment 20 (e.g., the virtualization server 26, the storefront server 28, etc.) are co-located in a datacenter (e.g., hosted on one or more data center servers) which utilizes the virtualization platform.

For illustration purposes only, the input devices 24 may be described at times in the context of external mouse devices that provide mouse input. However, it should be understood that other peripheral devices (and their respective pointer input) are suitable for use as well for these input device 24 such as trackballs, trackpads, trackpoints, joysticks, capacitance sensing and stylus equipped devices, combinations thereof, and so on.

During operation of the computing environment 20, users operate the user devices 22 to perform useful work. Such work may involve operating the touchscreens of the user devices 22. Along these lines, the users may enter user input (e.g., finger gestures) via the touchscreen and concurrently view user output on the touchscreen (e.g., read text, view video, etc.).

Additionally, the users may operate the input devices 24 to provide user input to the user devices 22. In the context of external mice, a user of the user device 22(1) may move an external mouse 24(1), depress and release buttons on the external mouse 24(1), etc. to control applications which are accessed via the user device 22(1). Similarly, a user of the user device 22(2) may operate the user device 22(2) using an external mouse 24(2), and so on. Simultaneously, the touchscreens of the user devices 22 may display user output in response to touchscreen input.

While controlling a user device 22 using an external mouse (or other type of peripheral device) 24, the user may operate the user device 22 to run local apps as well as establish a remote desktop session with the remote session equipment 26. Once the remote desktop session is established, the user is able to utilize a remote desktop hosted by the remote session equipment 26. That is, on the touchscreen of the user device 22, the user views remote desktop images of a remote desktop graphics stream provided by the remote session equipment 26. Additionally, the user is able to enter user input (e.g., text, screen coordinates, etc.) to control the remote desktop and perform useful work. In arrangements in which the user device 22 is a mobile device (e.g., a smart phone, a tablet, a laptop, etc.), the user is able to carry the user device 22 and perform work at various different locations (e.g., at the office, at home, in a public area such as a café, in another company's venue, etc.).

During such operation, the user device 22 is constructed and arranged to dynamically switch between a native pointer mode which provides a native pointer behavior and a desktop-class pointer mode which provides a desktop-class pointer behavior based on certain events such as context changes. Suitable context changes include moving a virtual desktop client into focus over a local application, moving a local application into focus over the virtual desktop client, launching the virtual desktop client, and terminating the virtual desktop client. Other events are suitable for use as well. Due to such dynamic switching, the user does not need to manually transition the user device 22 between modes while navigating among different applications which otherwise would be burdensome and/or prone to error. Further details will be provided with reference to FIG. 2.

Figure 2:
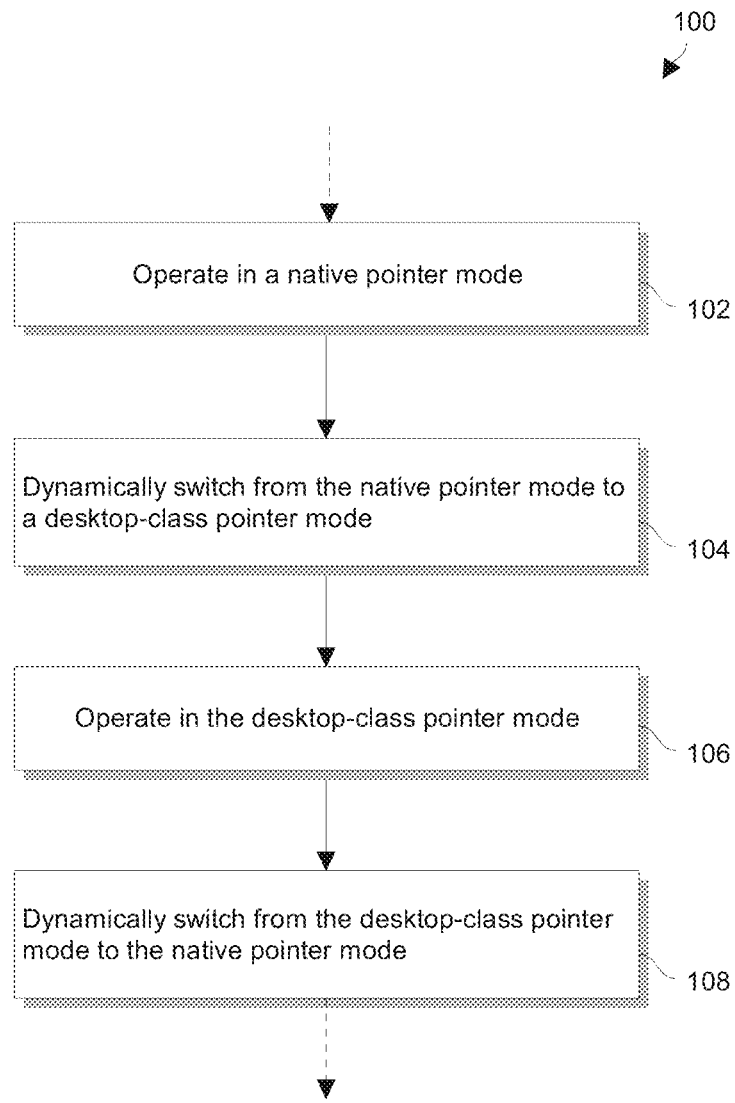
FIG. 2 is a flowchart of a procedure that is performed by a user device of the computing environment in accordance with certain embodiments.

FIG. 2 shows a procedure 100 which is performed by a user device 22 over a period of time in accordance with certain embodiments. The procedure 100 alleviates the need for a user to manually transition the user device 22 from one pointer mode to another.

At 102, the user device 22 operates in a native pointer mode (e.g., a native mouse mode). As illustrated by the dashed arrow entering 102, it should be understood that the user device 22 may enter the native pointer mode in response to starting up, changing context, manually switching to the native pointer mode in response to user control, etc.

During 102, the user device 22 receives a pointer signal from an input device 24 while the input device 24 is in the native pointer state to provide standard pointer input. In response to the standard pointer input, the user device 22 provides standard pointer behavior which may be viewable on the touchscreen of the user device 22. Such standard pointer behavior may include outputting a native pointer (i.e., an image of a round cursor) on the touchscreen, moving the native pointer on the touchscreen in response to movement of the input device 24, enabling the standard pointer input to control one or more applications locally running on the user device 22, and so on. During this time, the user device 22 may still respond to gestures provided on the touchscreen such as taps, swipes, two-finger swipes, simple touchscreen gestures which are mapped to assistive or complex touchscreen gestures, etc.

At 104, the user device 22 dynamically switches from the native pointer mode to a desktop-class pointer mode. As mentioned earlier, such a transition may be triggered by detection of a context change such as launching a virtual desktop client application and establishing a remote desktop session. In such a situation, the user device 22 no longer provides focus on a local application but instead provides focus on the remote desktop session. Here, the virtual desktop client determines that focus is on the remote desktop session and performs the mode transition. Further details will be provided shortly in connection with FIG. 3.

At 106, the user device 22 receives the pointer signal from the input device 24 while the input device 24 is in the desktop-class pointer state to provide augmented pointer input. In the context of an external mouse, the user device 22 determines whether the external mouse is in a native mouse state or a desktop-class mouse state based on a standard service identifier that the external mouse sends (e.g., the user device 22 recognizes an external mouse as being in the native mouse state when the standard service identifier is present, and in the desktop-class mouse state when the standard service identifier is not present).

In response to the augmented pointer input, the user device 22 provides desktop-class pointer behavior instead of the standard pointer behavior. Along these lines, the user device 22 hides (or no longer displays) the native pointer on the touchscreen and sends the desktop-class pointer input to a desktop-class (or style) interface which enables the user to access a desktop-class environment using the user device and the input device 24. The desktop-class environment may include a remote desktop (or virtualized) session to control a set of remote desktop session resources hosted on remote session equipment. Along these lines, the desktop-class pointer input may control movement, on the touchscreen, of a desktop-class pointer which looks different from the native pointer.

In accordance with certain embodiments, the desktop-class pointer is an image (e.g., an arrow) that the remote session equipment 26 provides to the user device 22 for rendering as the pointer while the user device 22 resides in the desktop-class pointer mode. The user device 22 moves this image within the touchscreen in response to movement of the input device 24 (i.e., in response to pointer coordinate data from the augmented pointer input). While doing so, the user device 22 sends the pointer coordinate data along with other pointer events (e.g., mouse button presses, etc.) to the remote session equipment 26 to enable operation of the input device 24 to control the remote desktop session.

At 108, the user device 22 dynamically switches from the desktop-class pointer mode to the native pointer mode. Again, such a transition may be triggered by detection of a context change such as moving the remote desktop session to the background, closing/exiting the remote desktop session, and so on. Here, the virtual desktop client determines that focus has been removed from the remote desktop session (e.g., to a local application) and automatically transitions the user device 22 back to the native pointer mode.

As illustrated by the dashed arrow exiting 108, the procedure 100 may include further activities such as operating in the native pointer mode again (i.e., returning to 102). Furthermore, it should be understood that the procedure 100 may be repeated while the user controls the user device 22. Further details will now be provided with reference to FIG. 3.

Figure 3:
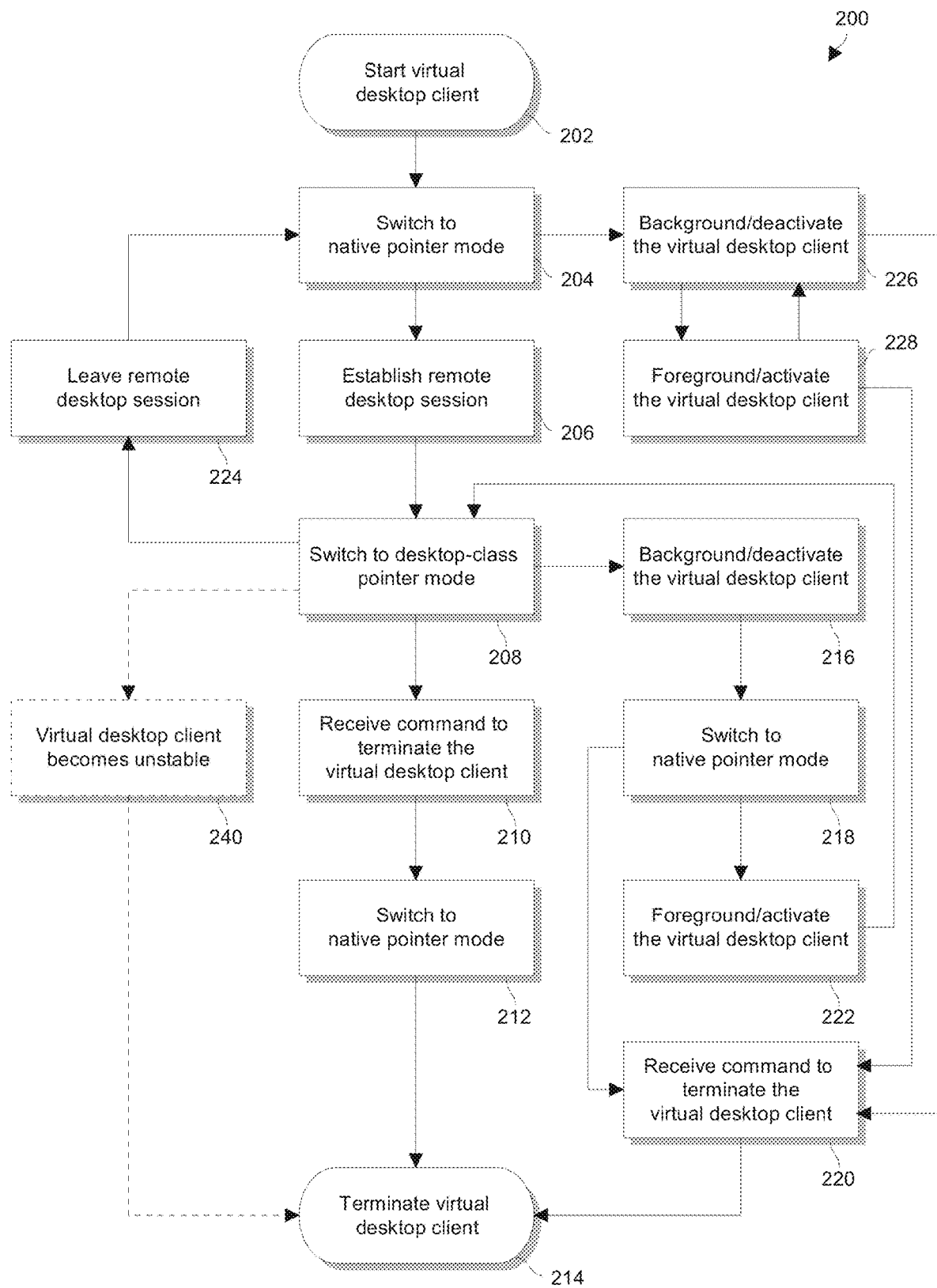
FIG. 3 is a flowchart of a detailed procedure in accordance with certain embodiments.

FIG. 3 shows, in accordance with certain embodiments, a detailed procedure 200 which is performed by a user device 22 when the user device 22 operates in accordance with a virtual desktop client which enables the user device 22 to establish remote desktop sessions with the remote session equipment 26 (FIG. 1). Recall that it was explained earlier that the software for such a virtual desktop client may be downloaded and installed from another device in the computing environment 20 (e.g., see the storefront server 28 in FIG. 1).

At 202, the user device 22 starts the virtual desktop client. For example, a user may invoke (or launch) a virtual desktop client application by tapping on an icon for the virtual desktop client on the touchscreen of the user device 22. At this point, the virtual desktop client is running on the user device 22 but the virtual desktop client has not yet established a remote desktop session with the remote session equipment 26. The user device 22 then proceeds to 204.

At 204, in response to invoking the virtual desktop client, the user device 22 switches to the native pointer mode. Here, the user device 22 connects with an input device 24 (unless a connection with the input device 24 already exists) and resets the input device 24 so that the input device 24 operates in the native pointer state rather than the desktop-class pointer state. It should be understood that the user device 22 does not yet switch to the desktop-class pointer mode because a remote desktop session does not yet exist. Once the user device 22 has switched to the native pointer mode, the user device 22 proceeds to 206.

At 206, the user device 22 establishes a remote desktop session to provide a remote desktop to the user. Such establishment may include one or more additional operations such as authenticating with the remote session equipment 26 (FIG. 1) for security purposes. The user device 22 then proceeds to 208.

At 208, with the remote desktop session now established, the user device 22 dynamically switches from the native pointer mode to the desktop class pointer mode without unnecessarily burdening the user. Here, the user device 22 configures the input device 24 to operate in the desktop-class pointer state (e.g., by sending a command to the input device 24). In response, the input device 24 may provide one or more special protocol indicators and/or related data within a pointer signal to enable the user device 22 to properly identify the pointer input for the remote desktop session. Along these lines, the pointer signal may include a bit that is cleared/set or a field containing a particular bitmap pattern (e.g., the absence of a standard service identifier for an external mouse). At this point, the user is able to control the virtual desktop client using the input device 24 to perform useful work via a remote desktop. Along these lines, the user may edit files, send and receive email, operate a web interface to navigate among different websites, access a database, and so on, via the remote desktop.

At some point, while at 208, the user device 22 may transition out of the desktop-class pointer mode and back to the native pointer mode in response to a variety of different events. Some events may enable the user device 22 to dynamically switch from the desktop-class pointer mode to the native pointer mode in a transparent and automated manner.

At 210, the user device 22 detects an event in which the user terminates the virtual desktop client (i.e., the virtual desktop client is closed by the user). For example, in the context of an external mouse, the user may mouse click on a button (or other object) or select a menu option on the touchscreen to close the virtual desktop client. In such a situation, at 210, the user device 22 detects the termination instruction, closes the remote desktop session, and proceeds to 212.

At 212, since the user device 22 is still in the desktop-class pointer mode, the user device 22 dynamically switches from the desktop-class pointer mode to the native pointer mode. As part of this process, the user device 22 may send a reset signal or a special command to the input device 24 so that the input device 24 again operates in the native pointer state rather than the desktop-class pointer state. Such resetting allows the operating system of the user device 22 to use the pointer input for local applications, etc. The user device 22 then proceeds to 214.

At 214, the user device 22 terminates (e.g., closes, exits, etc.) the virtual desktop client. At this point, the virtual desktop client is no longer running on the user device 22. Nevertheless, the user may control one or more local applications running on the user device 22 via the input device 24. Furthermore, the user may re-invoke the virtual desktop client to perform the procedure 200 again.

While at 208, suppose that the user does not wish to terminate the virtual desktop client. Instead, suppose that the user wishes to keep the established remote desktop session alive and to simply place the virtual desktop client in the background.

At 216, the user device 22 detects an event in which the virtual desktop client is deactivated and moved to the background (i.e., where the virtual desktop client is moved out of focus and therefore no longer receiving events). For example, the user may tap on the touchscreen to activate a local application. Such operation places the local application into focus over the virtual desktop client (i.e., places the virtual client application in the background). The user device 22 then proceeds to 218.

At 218, since the user device 22 has backgrounded the virtual desktop client but the user device 22 is currently in the desktop-class pointer mode, the user device 22 transitions to the native pointer mode. As mentioned earlier, such operation involves resetting the input device 24 so that the input device 24 operates in the native pointer state rather than the desktop-class pointer state. As a result, the operating system of the user device 22 is able to access the pointer input and the user is now able to operate one or more local applications running on the user device 22 using the input device 24 keeping the virtual desktop client in the background.

At some point later, the user may wish to terminate the virtual desktop client while the virtual desktop client is in the background or alternatively switch focus back to the virtual desktop client. If the user instructs the virtual desktop client to terminate (e.g., by clicking a button, etc.), the user device proceeds to 220.

At 220, the user device 22 receives a command to close the virtual desktop client. In such a situation, the user device 22 is already in the native pointer mode and simply closes the remote desktop session and proceeds to 214 where the user device 22 terminates the virtual desktop client.

On the other hand, at 222, if the user alternatively wishes to switch focus back to the virtual desktop client the user may move the virtual desktop client back into focus. In particular, the user device 22 receives a command that activates the virtual desktop client (i.e., places the virtual desktop client in the foreground) and proceeds to 208. For example, the user may click on the virtual desktop client to bring it into the foreground and wake it up from a dormant state.

It should be understood that the user may switch focus from the local application back to the virtual desktop client repeatedly. Such operation is illustrated by the loop of arrows among 208, 216, 218, 222, and back to 208. Here, the user device 22 may dynamically transition between the different pointer modes multiple times based on user input.

While at 208, the user may wish to close the remote desktop session but keep the virtual desktop application alive. Here, the user may enter a session quit command that ends the remote desktop session but leaves the virtual desktop client running on the user device 22. In this situation, the user device 22 proceeds from 208 to 224.

At 224, the user device 22 detects an event or user input that directs the user device 22 to exit or close the remote desktop session, e.g., the user device 22 receives the session quit command. In response, the user device 22 ends the remote session but the virtual desktop client does not terminate. The user device 22 then proceeds from 224 to 204 where the user device 22 switches from the desktop-class pointer mode back to the native pointer mode.

It should be understood that, with the virtual desktop client in the background with no remote desktop session established, the user may operate one or more local applications on the user device 22. For example, at 226, the user device 22 resides in the native pointer mode and provides pointer input from the input device 24 to a local application. During this time, the virtual desktop client is in the background (i.e., running but in a dormant state) and available to the user if the user wishes to establish a remote desktop session. In fact, if the user moves the virtual desktop client into the foreground (i.e., into focus), the user device 22 proceeds to 228.

At 228, the virtual desktop client is in the foreground (i.e., awakened from the dormant state, in focus, and receiving events). However, since there is no remote desktop session established (or opened), the user device 22 remains in the native pointer mode. In some arrangements, whenever the virtual desktop client moves to the foreground, the virtual desktop client checks to see whether there is a remote desktop session running and, since there no remote desktop session running here, the virtual desktop client does not switch from the native pointer mode.

It should be understood that the user device 22 may continue to move the virtual desktop client into the background or foreground while the user device 22 remains in the native pointer mode. Such activity is illustrated by the arrows between 226 and 228.

It should be further understood that the user may eventually terminate the virtual desktop client as shown by the arrows from 226 and 228 to 220. In particular, at 220, the user device 22 detects the termination instruction, and proceeds to 214 where the user device 22 terminates the virtual desktop client.

While at 208, recall that the user device 22 is in the desktop-class pointer mode and thus able to operate a remote desktop session. During this time, nothing precludes the user from imposing manual control, for example, to handle certain unexpected or unforeseen situations.

For example, while at 208, the user device 22 may detect an event in which the virtual desktop client becomes unstable or perhaps even terminates unexpectedly. Such a situation is illustrated by the dashed lines from 208, to 240, and to 214. In such a situation, the input device 24 may still reside in the desktop-class pointer state.

However, to address this situation, the user may manually perform a variety of different activities which moves the input device 24 back to the native pointer state. Along these lines, the user may restart the virtual desktop client (at 202) which will cause the user device 22 to reset the input device 24 (at 204) thus placing the input device 24 back in the native pointer state. Alternatively, the user may simply power cycle the input device 24 (i.e., turn the input device 24 off and back on). Furthermore, if the user device 22 is equipped with a specialized input device resetting app (e.g., acquired from the storefront server 28), the user may direct the specialized input device resetting app to send a reset signal to the input device 24 directing the input device 24 to re-enter the native pointer state. Further details will now be provided with reference to FIGS. 4 and 5.

Figure 4:
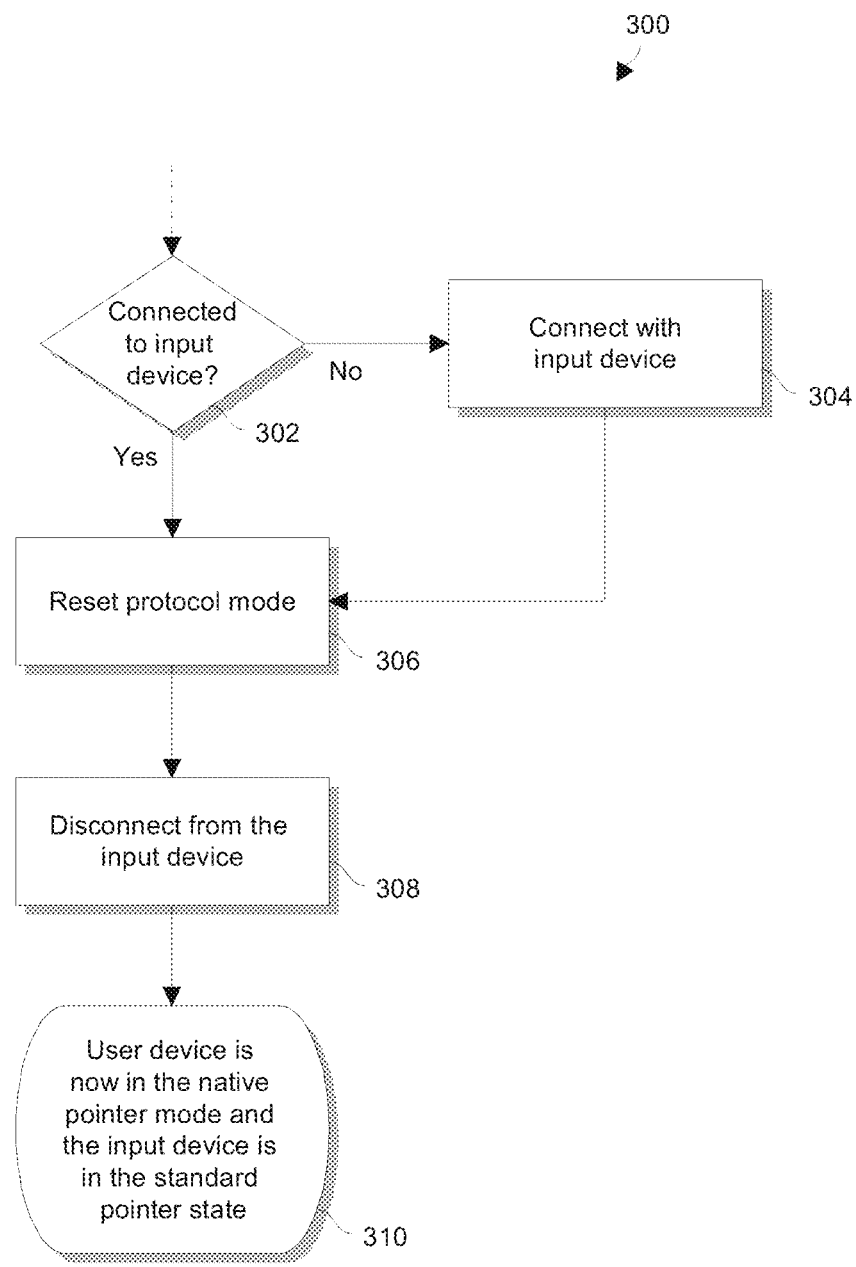
FIG. 4 is a flowchart of a procedure for switching a user device to a native pointer mode in accordance with certain embodiments.
Figure 5:
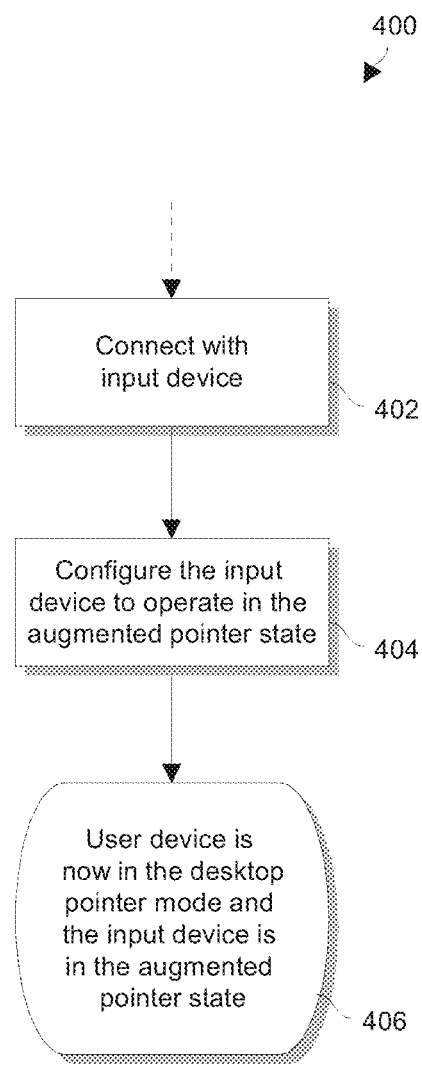
FIG. 5 is a flowchart of a procedure for switching a user device to a desktop-class pointer mode in accordance with certain embodiments.

FIGS. 4 and 5 show procedures performed by a user device 22 while operating in accordance with the virtual desktop client in order to dynamically switch the user device 22 to a particular pointer mode. FIG. 4 shows a detailed procedure 300 for dynamically switching the user device 22 to the native pointer mode. FIG. 5 shows a detailed procedure 400 for dynamically switching the user device 22 to the desktop-class pointer mode.

In connection with the procedure 300, the user device 22 dynamically switches to the native pointer mode. Such switching may occur at 204, 212, and 218 in the procedure 200 (also see FIG. 3).

As shown in FIG. 4, at 302, the user device 22 determines whether the user device 22 has already connected with the input device 24. For example, if the user device 22 is proceeding from 202 to 204, the user device 22 may not yet be connected with the input device 24. If the user device 22 is not connected with the input device 24, the user device proceeds to 304. However, if the user device 22 is already connected with the input device 24, the user device proceeds to 306.

At 304, the user device 22 connects with the input device 24. In accordance with certain embodiments, the user device 22 and the input device 24 communicate wirelessly (e.g., via RF communications) starting with a discovery process. Bluetooth® wireless technology is an example of a suitable wireless communications technology. After the user device 22 connects with the input device 24, the user device 22 proceeds to 306

At 306, the user device 22 sends a command or a reset signal to the input device 24. Since the input device 24 is capable of operating in different pointer states, if the input device 24 was in the desktop-class pointer state, the input device 24 exits from the desktop-class pointer state and enters the native pointer state. The user device 22 then proceeds to 308.

At 308, since the user device 22 is operating in accordance with the virtual desktop client, the user device 22 then disconnects from the input device 24. Such disconnection allows the operating system of the user device 22 to use the input device 24.

At 310, the user device 22 is now in the native pointer mode and the input device 24 is now in the native pointer state. Accordingly, the user is able to control local applications running on the user device 22 using the input device 24.

In connection with the procedure 400 (FIG. 5), the user device 22 dynamically switches to the desktop-class pointer mode. Such switching occurs at 208 in the procedure 200 (also see FIG. 3).

As shown in FIG. 5, at 402, the user device 22 connects with the input device 24. As mentioned earlier, in accordance with certain embodiments, the user device 22 and the input device 24 communicate wirelessly (e.g., via RF communications). After the user device 22 connects with the input device 24, the user device 22 proceeds to 404.

At 404, the user device 22 configures the input device 24 to operate in the desktop-class pointer state. Here, the user device 22 signals the input device 24 to operate in the desktop-class pointer state rather than the native pointer state. Along these lines, the user device 22 sends a command to the input device 24 directing the circuitry within the input device 24 to enter the desktop-class pointer state. The user device 22 then proceeds to 406.

At 406, the user device 22 is now in the desktop-class pointer mode and the input device 24 is now in the desktop-class pointer state. Accordingly, using the input device 24, the user is able to control a remote desktop session via the virtual desktop client running on the user device 22. Further details will now be provided with reference to FIG. 6.

Figure 6:
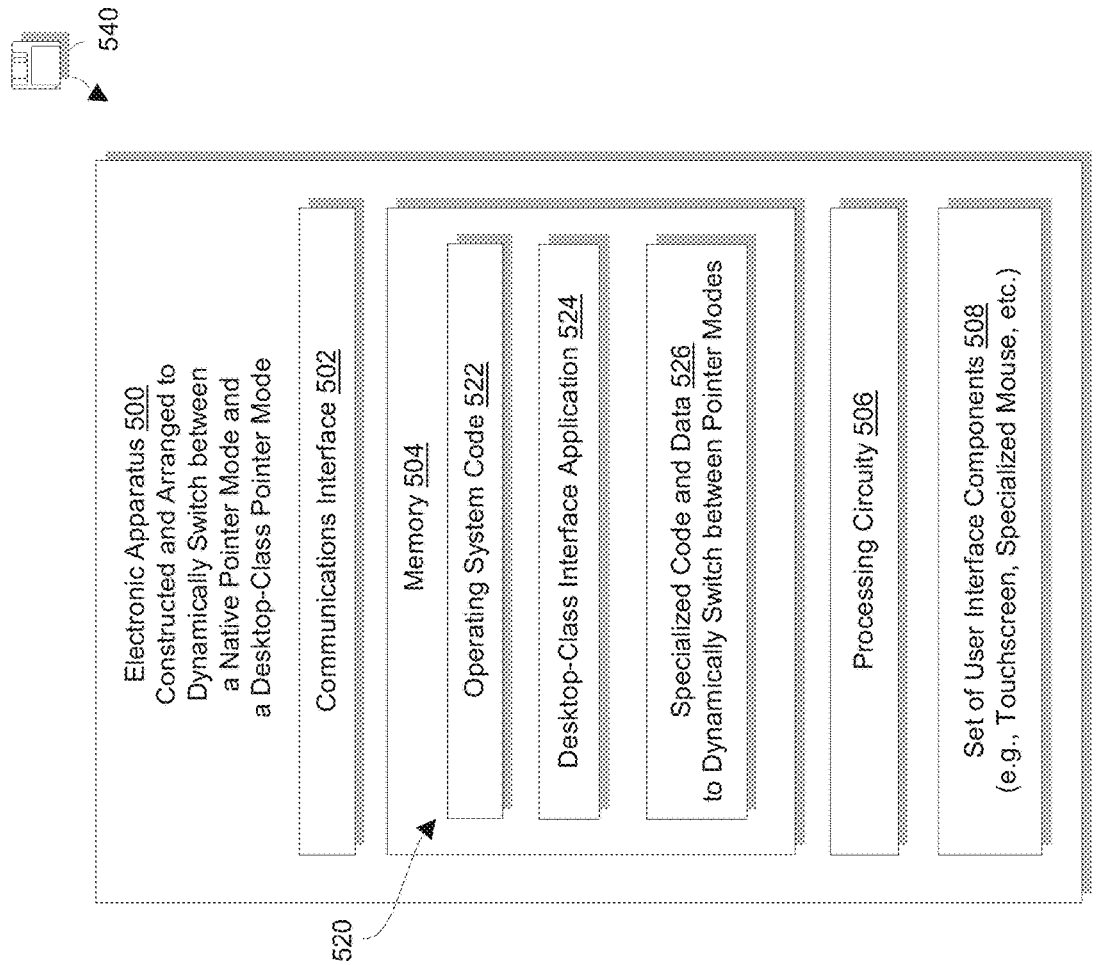
FIG. 6 is a block diagram of an electronic apparatus which is suitable for a user device of the computing environment in accordance with certain embodiments.

FIG. 6 shows an electronic apparatus 500 which is suitable for use as at least a portion of a user device 22. The electronic apparatus 500 is constructed and arranged to operate as a virtual desktop client which accesses a remote desktop. As shown in FIG. 6, the electronic apparatus 500 includes a communications interface 502, memory 504, and processing circuitry 506, and a set of user interface components 508.

The communications interface 502 is constructed and arranged to connect the electronic apparatus 500 to the communications medium 32 (also see FIG. 1). Accordingly, the communications interface 502 enables the electronic apparatus 500 to communicate with the other components of the computing environment 20 such as the remote session equipment 26 and the storefront server 28. Such communications may be line-based, wireless, combinations thereof, and so on. Moreover, such communications may utilize a variety of protocols (e.g., IP, cellular, fiber optic, RF, etc.).

The memory 504 is intended to represent both volatile storage (e.g., DRAM, SRAM, etc.) and non-volatile storage (e.g., flash memory, magnetic disk drives, etc.). The memory 504 stores a variety of software constructs 520 including an operating system 522, a desktop-class interface application 524, and specialized code and data 526 to dynamically switch between different pointer modes.

The processing circuitry 506 is constructed and arranged to operate in accordance with the various software constructs 520 stored in the memory 504. In particular, the processing circuitry 506, when executing the operating system 522, manages various resources of the electronic equipment 500 (e.g., memory allocation, processor cycles, hardware compatibility, etc.). Additionally, the processing circuitry 506, when operating in accordance with the desktop-class interface application 524, is constructed and arranged to form specialized control circuitry that provides access to a desktop-class environment. Furthermore, the processing circuitry 506, when operating in accordance with the specialized code and data 526, is constructed and arranged to dynamically switch between the different pointer modes, etc.

In accordance with some embodiments, the specialized code and data 526 is integrated with the desktop-class interface application 524. In accordance with other embodiments, the specialized code and data 526 and the desktop-class interface application 524 are separate and may operate independently, may be installed separately, etc.

It should be understood that the above-mentioned processing circuitry 506 may be implemented in a variety of ways including one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 540 is capable of delivering all or portions of the software to the electronic apparatus 500. The computer program product 540 has a non-transitory and non-volatile computer readable medium that stores a set of instructions to control one or more operations of the electronic apparatus 500. Examples of suitable computer readable storage media include tangible articles of manufacture and apparatus that store instructions in a non-volatile manner such as CD-ROM, flash memory, disk memory, tape memory, and the like.

The set of user interface components 508 refers to various user input/output (I/O) componentry that enables a user to enter user input into the electronic apparatus 500, and/or obtain user output from the electronic apparatus 500. In accordance with certain embodiments, the electronic apparatus 500 includes a touchscreen and a specialized input device which may be considered part of or separate from a user device 22 (e.g., an augmented Bluetooth® wireless technology mouse, other types of peripheral devices, etc.).

During operation, the processing circuitry 506 when executing the desktop-class interface application 524 forms specialized circuitry that enables the electronic apparatus 500 to establish a remote desktop session. Accordingly, the user is able to operate a remote desktop to perform useful work.

Additionally, the processing circuitry 506 when executing in accordance with the specialized code and data 526 forms specialized circuitry that enables the electronic apparatus 500 to dynamically switch between different pointer modes (e.g., also see FIGS. 3 through 5). Accordingly, the user does not need to manually configure the electronic apparatus 500 (i.e., the user device 22) and the input device 24 when switching between a remote desktop session and location applications. Further details will now be provided with reference to FIG. 7.

Figure 7:
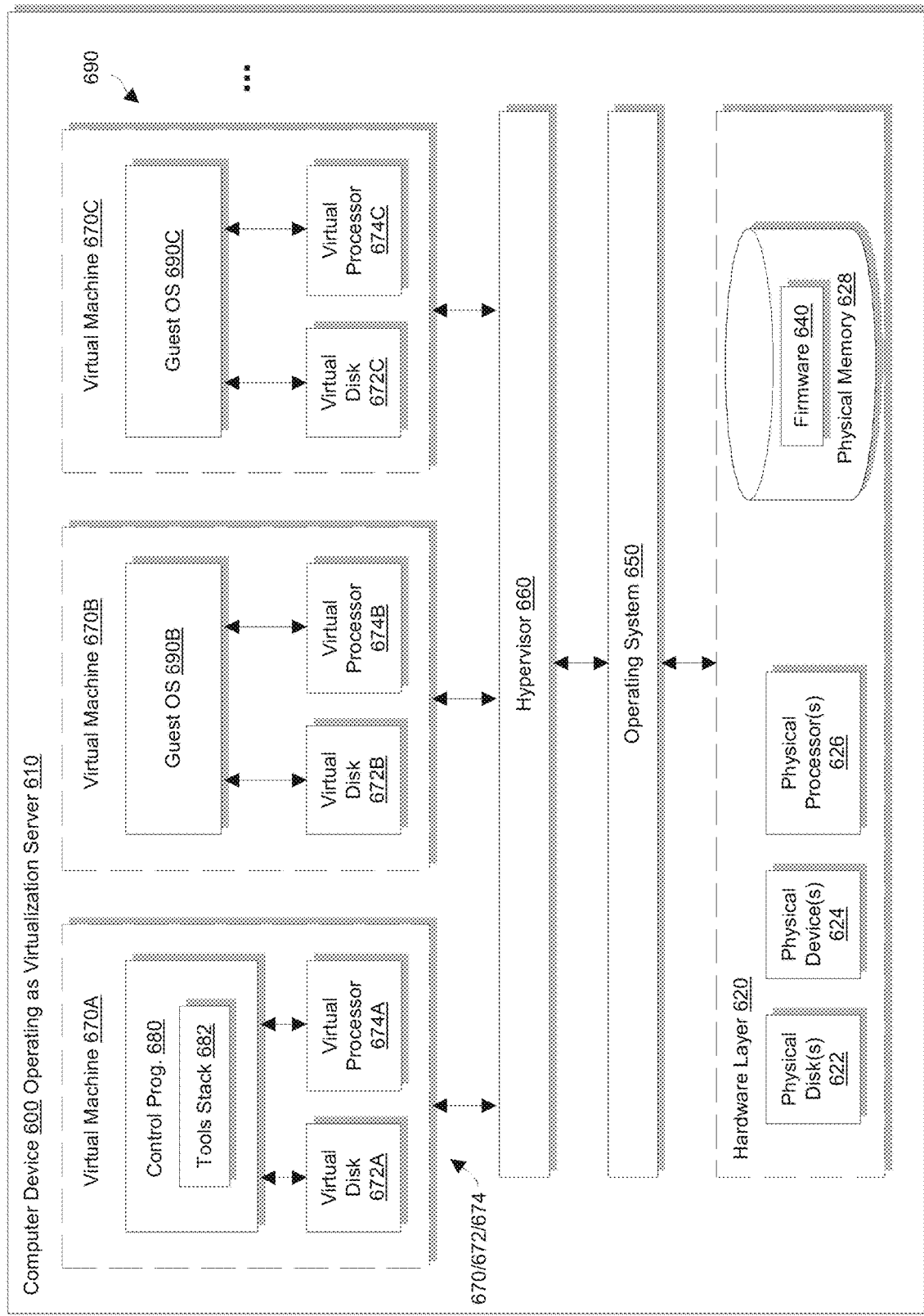
FIG. 7 is a block diagram of a virtualization server which is suitable for remote session equipment of the computing environment in accordance with certain embodiments.

FIG. 7 shows a high-level architecture of an illustrative desktop virtualization system. Such a system is suitable for use as at least a portion of the remote session equipment 26 (also see FIG. 1).

As shown in FIG. 7, the desktop virtualization system may be a single-server or multi-server system, or a cloud system, including at least one computer device 600 operating as a virtualization server 610 configured to provide virtual desktops and/or virtual applications to one or more client access devices (e.g., user devices 22). As used herein, a desktop may refer to a graphical environment (e.g., a graphical user interface) or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per physical device) or virtual (e.g., many instances of an OS running on a single physical device). Each application may be executed on a local device, or executed on a remotely located device (e.g., remoted).

The computer device 600 may be configured as a virtualization server in a virtualization environment, for example, a single-server, multi-server, or cloud computing environment. Virtualization server 610 illustrated in FIG. 7 may be deployed as and/or implemented by one or more embodiments of the earlier-mentioned remote session equipment 26 or by other known computing devices. Included in virtualization server 610 is hardware layer 620 that may include one or more physical disks 622, one or more physical devices 624, one or more physical processors 626, and one or more physical memories 628. In some embodiments, firmware 640 may be stored within a memory element in physical memory 628 and be executed by one or more of physical processors 626. Virtualization server 610 may further include operating system 650 that may be stored in a memory element in physical memory 628 and executed by one or more of physical processors 626. Still further, hypervisor 660 may be stored in a memory element in physical memory 328 and be executed by one or more of physical processors 326. Presence of operating system 650 may be optional such as in a case where the hypervisor 660 is a Type A hypervisor.

Executing on one or more of physical processors 626 may be one or more virtual machines 670A, 670B, 670C, . . . (generally, VMs 670). The VMs 670A, 670B, 670C, . . . respective virtual disks 672A, 672B, 672C, . . . (generally, virtual disks 672) and respective virtual processors 674A, 674B, 674C, . . . (generally, virtual processors 674). In some embodiments, the first VM 670A may execute, using virtual processor 674A, control program 680 that includes tools stack 682. Control program 680 may be referred to as a control virtual machine, Domain 0, Dom0, or other virtual machine used for system administration and/or control. In some embodiments, one or more VMs 670B, 670C, . . . may execute, using their respective virtual processors 674B, 674C, . . . , guest operating systems 690B, 690C, . . . (generally, guest operating systems 690).

Physical devices 624 may include, for example, a network interface card, a video card, an input device (e.g., a keyboard, a mouse, a scanner, etc.), an output device (e.g., a monitor, a display device, speakers, a printer, etc.), a storage device (e.g., an optical drive), a Universal Serial Bus (USB) connection, a network element (e.g., router, firewall, network address translator, load balancer, virtual private network (VPN) gateway, Dynamic Host Configuration Protocol (DHCP) router, etc.), or any device connected to or communicating with virtualization server 610. Physical memory 628 in hardware layer 620 may include any type of memory. Physical memory 628 may store data, and in some embodiments may store one or more programs, or set of executable instructions. FIG. 7 illustrates an embodiment where firmware 640 is stored within physical memory 628 of virtualization server 610. Programs or executable instructions stored in physical memory 628 may be executed by the one or more processors 626 of virtualization server 610.

Virtualization server 610 may also include hypervisor 660. In some embodiments, hypervisor 660 may be a program executed by processors 626 on virtualization server 610 to create and manage any number of virtual machines 670. Hypervisor 660 may be referred to as a virtual machine monitor, or platform virtualization software. In some embodiments, hypervisor 660 may be any combination of executable instructions and hardware that monitors virtual machines 670 executing on a computing machine. Hypervisor 660 may be a Type 2 hypervisor, where the hypervisor executes within operating system 650 executing on virtualization server 610. Virtual machines may then execute at a layer above hypervisor 660. In some embodiments, the Type 2 hypervisor may execute within the context of a user's operating system such that the Type 2 hypervisor interacts with the user's operating system. In other embodiments, one or more virtualization servers 610 in a virtualization environment may instead include a Type 1 hypervisor (not shown). A Type 1 hypervisor may execute on virtualization server 610 by directly accessing the hardware and resources within hardware layer 610. That is, while Type 2 hypervisor 660 accesses system resources through host operating system 650, as shown, a Type 1 hypervisor may directly access all system resources without host operating system 610. A Type 1 hypervisor may execute directly on one or more physical processors 626 of virtualization server 610, and may include program data stored in physical memory 628.

Hypervisor 650, in some embodiments, may provide virtual resources to guest operating systems 690 or control programs 680 executing on virtual machines 670 in any manner that simulates operating systems 690 or control programs 680 having direct access to system resources. System resources can include, but are not limited to, physical devices 622, physical disks 624, physical processors 626, physical memory 628, and any other component included in hardware layer 620 of virtualization server 610. Hypervisor 660 may be used to emulate virtual hardware, partition physical hardware, virtualize physical hardware, and/or execute virtual machines that provide access to computing environments. In still other embodiments, hypervisor 660 may control processor scheduling and memory partitioning for virtual machines 670 executing on virtualization server 610. Examples of hypervisor 660 may include those manufactured by VMWare, Inc., of Palo Alto, Calif.; Xen Project® hypervisor, an open source product whose development is overseen by the open source XenProject.org community; Hyper-V®, Virtual Server®, and Virtual PC® hypervisors provided by Microsoft Corporation of Redmond, Wash.; or others. In some embodiments, virtualization server 610 may execute hypervisor 660 that creates a virtual machine platform on which guest operating systems 690 may execute. In these embodiments, virtualization server 610 may be referred to as a host server. An example of such a virtualization server is Citrix Hypervisor® provided by Citrix Systems, Inc., of Fort Lauderdale, Fla.

Hypervisor 660 may create one or more virtual machines 670 in which guest operating systems 690 execute. In some embodiments, hypervisor 660 may load a virtual machine image to create virtual machine 670. The virtual machine image may refer to a collection of data, states, instructions, etc. that make up an instance of a virtual machine. In other embodiments, hypervisor 660 may execute guest operating system 690 within virtual machine 670. In still other embodiments, virtual machine 670 may execute guest operating system 690.

In addition to creating virtual machines 670, hypervisor 660 may control the execution of at least one virtual machine 670. In other embodiments, hypervisor 660 may present at least one virtual machine 670 with an abstraction of at least one hardware resource provided by virtualization server 610 (e.g., any hardware resource available within hardware layer 610). In other embodiments, hypervisor 660 may control the manner in which virtual machines 670 access physical processors 626 available in virtualization server 610. Controlling access to physical processors 626 may include determining whether virtual machine 670 should have access to processor 626, and how physical processor capabilities are presented to virtual machine 670.

As shown in FIG. 7, virtualization server 610 may host or execute one or more virtual machines 670. Virtual machine 670 may be a set of executable instructions and/or user data that, when executed by processor 626, may imitate the operation of a physical computer such that virtual machine 670 can execute programs and processes much like a physical computing device. While FIG. 7 illustrates an embodiment where virtualization server 610 hosts three virtual machines 670, in other embodiments virtualization server 610 may host any number of virtual machines 670. Hypervisor 660, in some embodiments, may provide each virtual machine 670 with a unique virtual view of the physical hardware, including memory 628, processor 626, and other system resources 622, 624 available to that virtual machine 670. In some embodiments, the unique virtual view may be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 660 may create one or more unsecure virtual machines 670 and one or more secure virtual machines 670. Unsecure virtual machines 670 may be prevented from accessing resources, hardware, memory locations, and programs that secure virtual machines 670 may be permitted to access. In other embodiments, hypervisor 610 may provide each virtual machine 670 with a substantially similar virtual view of the physical hardware, memory, processor, and other system resources available to virtual machines 670.

Each virtual machine 670 may include a respective virtual disk 672 and respective virtual processor 674. Virtual disk 672, in some embodiments, may be a virtualized view of one or more physical disks 622 of virtualization server 610, or a portion of one or more physical disks 622 of virtualization server 610. The virtualized view of physical disks 622 may be generated, provided, and managed by hypervisor 660. In some embodiments, hypervisor 660 may provide each virtual machine 670 with a unique view of physical disks 622. Thus, in these embodiments, particular virtual disk 622 included in each virtual machine 670 may be unique when compared with other virtual disks 672.

Virtual processor 674 may be a virtualized view of one or more physical processors 626 of virtualization server 610. In some embodiments, the virtualized view of physical processors 626 may be generated, provided, and managed by hypervisor 660. In some embodiments, virtual processor 674 may have substantially all of the same characteristics of at least one physical processor 626. In other embodiments, virtual processor 674 may provide a modified view of physical processors 626 such that at least some of the characteristics of virtual processor 674 are different from the characteristics of the corresponding physical processor 626.

As described above, improved techniques involve dynamically switching a user device 22 (e.g., a smart phone, a tablet, a laptop equipped with a touchscreen, other mobile and/or touch devices, etc.) between a native pointer mode and a desktop-class pointer mode when processing input from a peripheral device such as an external mouse. Such switching may be in response to events such as context changes which occur and are detected in real time.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the remote session equipment 26 and/or the storefront server 28 (FIG. 1) are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, cellular-based communications, combinations thereof, and so on.

Additionally, disclosed herein and in accordance with certain embodiments are techniques for dynamically switching between a native tablet mouse mode and a desktop mouse mode (or similar pointer modes for other input devices) as the application context changes. Such embodiments may be suitable for use with particular mobile device operating systems (e.g., iOS 13, iPadOS, etc.).

It should be understood that certain operating systems may have been mentioned above by way of example only. However, the particular techniques disclose herein are suitable for various operating system and platforms, and are not tied to or dependent on any particular operating system or platform.

It should be further understood that, in accordance with certain embodiments, a workspace (or remote session/desktop) app may provide support for desktop mouse mode while in a Virtual Apps and Desktops session and when using a specialized or augmented mouse such as the Citrix X1 Mouse provided by Citrix Systems, Inc. of Fort Lauderdale, Fla. With the addition of native mouse input in assistive touch features in certain mobile device operating systems, this creates a conflict. Either the existing desktop mouse mode can continue to be used but without native mouse input elsewhere in the app or in other apps, or the native mouse mode could be used everywhere in the app, but eliminating the existing desktop mouse mode used in a virtual session.

The exclusive nature of this can be due to how the mobile device operating system and the Bluetooth® wireless technology protocol operate. Once an app connects directly to the specialized mouse used in native mouse mode, that disables the native mouse mode. Further, the workspace app is able to use the specialized mouse in desktop mouse mode by adjusting the protocol mode on the mouse, which in turn prevents the mobile device operating system from using it in native mouse mode.

To address this conflict, techniques may establish a dynamic/hybrid mouse operation, switching between the two modes as needed.

1. Connect to the mouse and configure the protocol mode when the app needs to use it in desktop mode. This for example occurs when the user enters a Virtual Apps and Desktops session.

2. Reset the protocol mode and disconnect from the mouse when the app wants to switch back to native tablet mode. This occurs when the user leaves the Virtual Apps and Desktops session or leaves the app.

This allows the Workspace app to use the mouse in desktop mode while in a Virtual Apps and Desktops session and allows the mobile device operating system to use the mouse in native tablet mode when outside the session or when outside the app.

To handle cases where the mouse protocol mode of the specialized mouse might not have been reset properly (i.e. in the event the application was terminated abnormally), one of the following can be used to reset the mouse mode, allowing it to be used in native tablet mode.

1. Switch the mouse OFF and back ON.
2. Launch the application again.
3. Have a background application monitor the state of the main application and reset the mouse mode when the main application is terminated, in case the mouse mode was not reset properly.

To handle cases where the application may be running alongside another application in a split screen setup on the mobile device, the mouse mode switching includes triggers for activation and deactivation events as well as edge detection of the mouse point position—in addition to foreground and background events.

To handle cases where a Virtual Apps and Desktops session is hosted within a portion of an app such as a split screen layout within the app or a picture in picture layout within the app, the mouse mode switching includes triggers for area activation and area edge detection of the mouse pointer position, where one such area is a Virtual Apps and Desktops session area and another such area is a native app area.

In accordance with certain embodiments, as the user context in a mobile app switches between a tablet interface and a desktop interface, the mouse mode also switches from native tablet mode to desktop mouse mode. This allows each interface to make use of the mouse in the mode it was designed for.

Additionally, in accordance with certain embodiments:
1. The transition of the mouse mode is automatic—the user does not have to initiate it.
2. The transition of the mouse mode is immediate—the user does not have to wait for it.
3. The user can use the mouse with a mobile device without a need for touch events.

Furthermore, certain techniques that are disclosed herein are well suited for user devices that not only run local applications but also provide access to virtual environments. Along these lines and in accordance with certain embodiments, a user may run a virtual desktop client on a user device to access to a virtual desktop provided by a virtual desktop server. The virtual desktop may include a variety of virtual desktop applications such as a document editor, an email client, a web browser, and so on.

It should be understood that the terms input device and external mouse may have been used interchangeably and/or synonymously within this document. However, in some situations, one or more input devices 24 may be an external mouse. In some situations, one or more input devices 24 may be a peripheral device that is not an external mouse but a different type of pointer such as a trackball, a trackpad, a trackpoint, a joystick, a capacitance sensing device, a stylus equipped device, combinations thereof, etc. For example, with reference to FIG. 1, the input device 24(1) may be an external mouse, the input device 24(2) may be a trackpoint device, and so on. Such arrangements, modifications and enhancements are intended to belong to various embodiments of the disclosure.

What is claimed is:

1. In a user device comprising a touchscreen, a method of processing pointer input from an input device, the method comprising:
    launching a virtual desktop client application on the user device;
    in response to launching the virtual desktop client application, establishing a remote desktop session hosted on equipment that is remote from the user device;
    in response to establishing the remote desktop session, sending, from the user device to the input device, a wireless command that switches the input device from a native pointer state to a desktop-class pointer state, wherein the input device in the desktop-class pointer state provides desktop class pointer data that excludes a service identifier as the pointer input;
    providing the pointer input from the input device in the desktop-class pointer state to the remote desktop session;
    detecting an event on the user device, the event indicative of deactivation of the remote desktop session;
    in response to detecting the event, sending, from the user device to the input device, a wireless reset signal that switches the input device from the desktop-class pointer state to the native pointer state, wherein the input device in the native pointer state provides native pointer data that includes the service identifier as the pointer input; and
    in response to switching the input device from the desktop-class pointer state to the native pointer state, providing the pointer input from the input device in the native pointer state to at least one local application executing on the user device instead of the remote desktop session.

2. A method as in claim 1 wherein providing the pointer input from the input device in the desktop-class pointer state to the remote desktop session includes:
    displaying a first cursor on the touchscreen and moving the first cursor in response to the pointer input from the input device; and
    wherein providing the pointer input from the input device in the native pointer state to the at least one local application executing on the user device includes:
    displaying a second cursor on the touchscreen in place of the first cursor and moving the second cursor in response to the pointer input from the input device, the first cursor and the second cursor being visually different.

3. A method as in claim 2, further comprising:
    while providing the pointer input from the input device in the desktop-class pointer state to the remote desktop session, displaying a view of a virtual desktop on the touchscreen, the first cursor moving within the view of the virtual desktop in response to the pointer input from the input device.

4. A method as in claim 3 wherein displaying the first cursor on the touchscreen and moving the first cursor in response to the pointer input from the input device includes:
    controlling at least one remote application viewable in the virtual desktop using the pointer input from the input device in the desktop-class pointer state, the at least one remote application being hosted remotely from the user device.

5. A method as in claim 1, further comprising:
    after the pointer input from the input device in the native pointer state is provided to the at least one local application, detecting another event, the another event indicative of activation of the remote desktop session; and
    in response to detecting the another event, transitioning from providing the pointer input from the input device in the native pointer state to providing the pointer input from the input device in the desktop-class pointer state, the native pointer state configured to provide the input from the input device to the at least one local application, and the desktop-class pointer state configured to provide the input from the input device to the remote desktop session.

6. A method as in claim 1 wherein detecting the event includes:
    detecting, as the event, deactivation and placement of the remote desktop session in the background; and
    wherein the method further comprises:
    switching from providing the pointer input from the input device in the desktop-class pointer state to the remote desktop session to providing the pointer input from the input device in the native pointer state to the at least one local application in response to deactivation and placement of the remote desktop session in the background.

7. A method as in claim 1 wherein detecting the event includes:
    detecting, as the event, termination of the remote desktop session; and
    wherein the method further comprises:
    switching from providing the pointer input from the input device in the desktop-class pointer state to the remote desktop session to providing the pointer input from the input device in the native pointer state to the at least one local application in response to termination of the remote desktop session.

8. A method as in claim 1 wherein detecting the event includes:
    detecting, as the event, activation of the at least one local application over the remote desktop session; and
    wherein the method further comprises:
    switching from providing the pointer input from the input device in the desktop-class pointer state to the remote desktop session to providing the pointer input from the input device in the native pointer state to the at least one local application in response to activation of the at least one local application over the remote desktop session.

9. A method as in claim 1 wherein detecting the event includes:
    detecting, as the event, exiting of the remote desktop session due to an application crash; and
    wherein the method further comprises:
    switching from providing the pointer input from the input device in the desktop-class pointer state to the remote desktop session to providing the pointer input from the input device in the native pointer state to the at least one local application in response to exiting of the remote desktop session due to an application crash.

10. A method as in claim 1 wherein the input device is an external mouse; and
wherein the user device communicates with the external mouse via wireless technology communications, and wherein the user device communicates with the remote desktop session via a computerized network.

11. A method as in claim 1, further comprising:
wherein the remote desktop session comprises a virtual desktop established by the launching of the virtual desktop client application.

12. A computer program product having a non-transitory computer readable medium that stores a set of instructions to process pointer input from an input device; the set of instructions, when carried out by a user device comprising a touchscreen, causing the user device to perform a method of:
launching a virtual desktop client application on the user device;
in response to launching the virtual desktop client application, establishing a remote desktop session hosted on equipment that is remote from the user device;
in response to establishing the remote desktop session, sending, from the user device to the input device, a wireless command that switches the input device from a native pointer state to a desktop-class pointer state, wherein the input device in the desktop-class pointer state provides desktop class pointer data that excludes a service identifier as the pointer input;
providing the pointer input from the input device in the desktop-class pointer state to the remote desktop session;
detecting an event on the user device, the event indicative of deactivation of the remote desktop session; and
in response to detecting the event, sending, from the user device to the input device, a wireless reset signal that switches the input device from the desktop-class pointer state to the native pointer state, wherein the input device in the native pointer state provides native pointer data that includes the service identifier as the pointer input; and
in response to switching the input device from the desktop-class pointer state to the native pointer state, providing the pointer input from the input device in the native pointer state to at least one local application executing on the user device instead of the remote desktop session.

13. A user device, comprising:
a touchscreen;
memory; and
control circuitry coupled to the touchscreen and the memory, the memory storing instructions that, when carried out by the control circuitry, cause the control circuitry to:
launch a virtual desktop client application on the user device;
in response to launching the virtual desktop client application, establish a remote desktop session hosted on equipment that is remote from the user device;
in response to establishing the remote desktop session, send, from the user device to the input device, a wireless command that switches the input device from a native pointer state to a desktop-class pointer state, wherein the input device in the desktop-class pointer state provides desktop class pointer data that excludes a service identifier as the pointer input;
provide pointer input from an input device in the desktop-class pointer state to the remote desktop session;
detect an event on the user device, the event indicative of deactivation of the remote desktop session;
in response to detecting the event, send, from the user device to the input device, a wireless reset signal that switches the input device from the desktop-class pointer state to the native pointer state, wherein the input device in the native pointer state provides native pointer data that includes the service identifier as the pointer input; and
provide the pointer input from the input device in the native pointer state to at least one local application executing on the user device instead of the remote desktop session.

14. A method of controlling a user device comprising a touchscreen from an input device, the method comprising:
launching a virtual desktop client application on the user device;
in response to launching the virtual desktop client application, establishing a remote desktop session hosted on equipment that is remote from the user device;
in response to establishing the remote desktop session, sending, from the user device to the input device, a wireless command that switches the input device from a native pointer state to a desktop-class pointer state, wherein the input device in the desktop-class pointer state provides desktop class pointer data that excludes a service identifier as the pointer input;
providing first pointer input from the input device in the desktop-class pointer state to the user device to control the remote desktop session;
providing second pointer input from the input device to the user device to provide a context change from the remote desktop session to at least one local application executing on the user device;
in response to the context change, receive, at the input device, a wireless reset command from the user device indicating that the user device has dynamically switched from a desktop-class pointer mode to a native pointer mode due to the context change from the remote desktop session to the at least one local application;
in response to receipt of the wireless reset command, transitioning the input device from the desktop-class pointer state in which the input device provides the desktop-class pointer data that excludes the service identifier as the pointer input to the native pointer state in which the input device provides native pointer data that includes the service identifier as the pointer input; and
after transitioning the input device from the desktop-class pointer state to the native pointer state, providing third pointer input from the input device in the native pointer state to the user device to control the at least one local application instead of the remote desktop session.

15. A method as in claim 14, further comprising:
after providing the third pointer input, providing fourth pointer input from the input device to the user device to provide another context change from the at least one local application executing on the user device to the remote desktop session which is hosted on the equipment that is remote from the user device.

16. An electronic device, comprising:
a body;
a touchscreen;

a communications interface; and circuitry disposed with the body and coupled with the communications interface, the circuitry being constructed and arranged to:

launch a virtual desktop client application on the user device;

in response to launching the virtual desktop client application, establish a remote desktop session hosted on equipment that is remote from the user device;

in response to establishing the remote desktop session, send, from the user device to the input device, a wireless command that switches the input device from a native pointer state to a desktop-class pointer state, wherein the input device in the desktop-class pointer state provides desktop class pointer data that excludes a service identifier as the pointer input;

provide first pointer input from the input device in the desktop-class pointer state to the user device through the communications interface to control the remote desktop session;

provide second pointer input from the input device to the user device through the communications interface to provide a context change from the remote desktop session to at least one local application executing on the user device;

in response to the context change, receive, at the input device, a wireless reset command from the user device indicating that the user device has dynamically switched from a desktop-class pointer mode to a native pointer mode due to the context change from the remote desktop session to the at least one local application;

in response to receipt of the wireless reset command, transition the input device from the desktop-class pointer state in which the input device provides the desktop-class pointer data that excludes the service identifier as the pointer input to the native pointer state in which the input device provides native pointer data that includes the service identifier as the pointer input; and provide third input from the input device in the native pointer state to the user device through the communications interface to control the at least one local application instead of the remote desktop session.

\* \* \* \* \*